United States Patent [19]

Perez, III

[11] Patent Number: 5,531,154
[45] Date of Patent: Jul. 2, 1996

[54] COMBINATION OUTDOOR COOKER AND SMOKER

[76] Inventor: Manuel Perez, III, 11204 Hidden Valley Dr., Tampa, Fla., 33624

[21] Appl. No.: 560,665

[22] Filed: Nov. 20, 1995

Related U.S. Application Data

[63] Continuation of Ser. No. 390,229, Feb. 17, 1995, Pat. No. 5,467,692.

[51] Int. Cl.⁶ .............................. A47J 37/04; A47J 37/07
[52] U.S. Cl. ................ 99/340; 99/450; 99/482; 126/9 R; 126/25 R
[58] Field of Search ...................... 99/339, 340, 444–446, 99/448–450, 447, 481, 482; 126/25 R, 25 A, 9 R, 9 A, 9 B, 41 R, 30; 248/131, 154, 172, 149, 310, 125.3, 154, 907, 542, 544, 505–507

[56] References Cited

U.S. PATENT DOCUMENTS

| | | | |
|---|---|---|---|
| 3,298,301 | 1/1967 | Lowndes | 99/340 |
| 4,020,322 | 4/1977 | Muse | 99/450 |
| 4,094,295 | 6/1978 | Boswell et al. | 126/25 R |
| 4,108,142 | 8/1978 | Barson et al. | 126/41 R |
| 4,495,860 | 1/1985 | Hitch et al. | 126/9 R |
| 4,554,864 | 11/1985 | Smith et al. | 99/340 |
| 4,957,039 | 9/1990 | Reyes | 99/482 |
| 4,962,696 | 10/1990 | Gillis | 99/340 |
| 4,962,697 | 10/1990 | Farrar | 99/449 |
| 5,184,599 | 2/1993 | Stuart | 126/25 R |
| 5,325,841 | 7/1994 | Hooper, Sr. | 99/447 |
| 5,359,923 | 11/1994 | Boswell | 99/340 |

*Primary Examiner*—Timothy F. Simone
*Attorney, Agent, or Firm*—A. W. Fisher, III

[57] ABSTRACT

A combination outdoor cooker and smoker having a cooker configuration for use as an outdoor cooker and a smoker configuration for use as a smoker comprising a cooker assembly including substantially cylindrical hollow housing having a heat source therein and a support grate supported thereon disposed in heat exchange relationship relative to the heat source and a plurality of support legs attached to the substantially cylindrical hollow housing each having a first support configuration to support the combination outdoor cooker and smoker on a table and a second support configuration to support the combination outdoor cooker and smoker on the ground, a smoker enclosure detachably mountable on the cooker assembly when the combination outdoor cooker and smoker is in the smoker configuration and a retention assembly comprising a plurality of retention brackets attached to the cooker assembly each having a cooker retention configuration to retain a cooking utensil in operative relationship relative to the support grate when the combination cooker and smoker is in the cooker configuration and a smoker retention configuration to retain the smoke enclosure in operative relationship relative to the support grate when the combination cooker and smoker is in the smoker configuration.

5 Claims, 5 Drawing Sheets

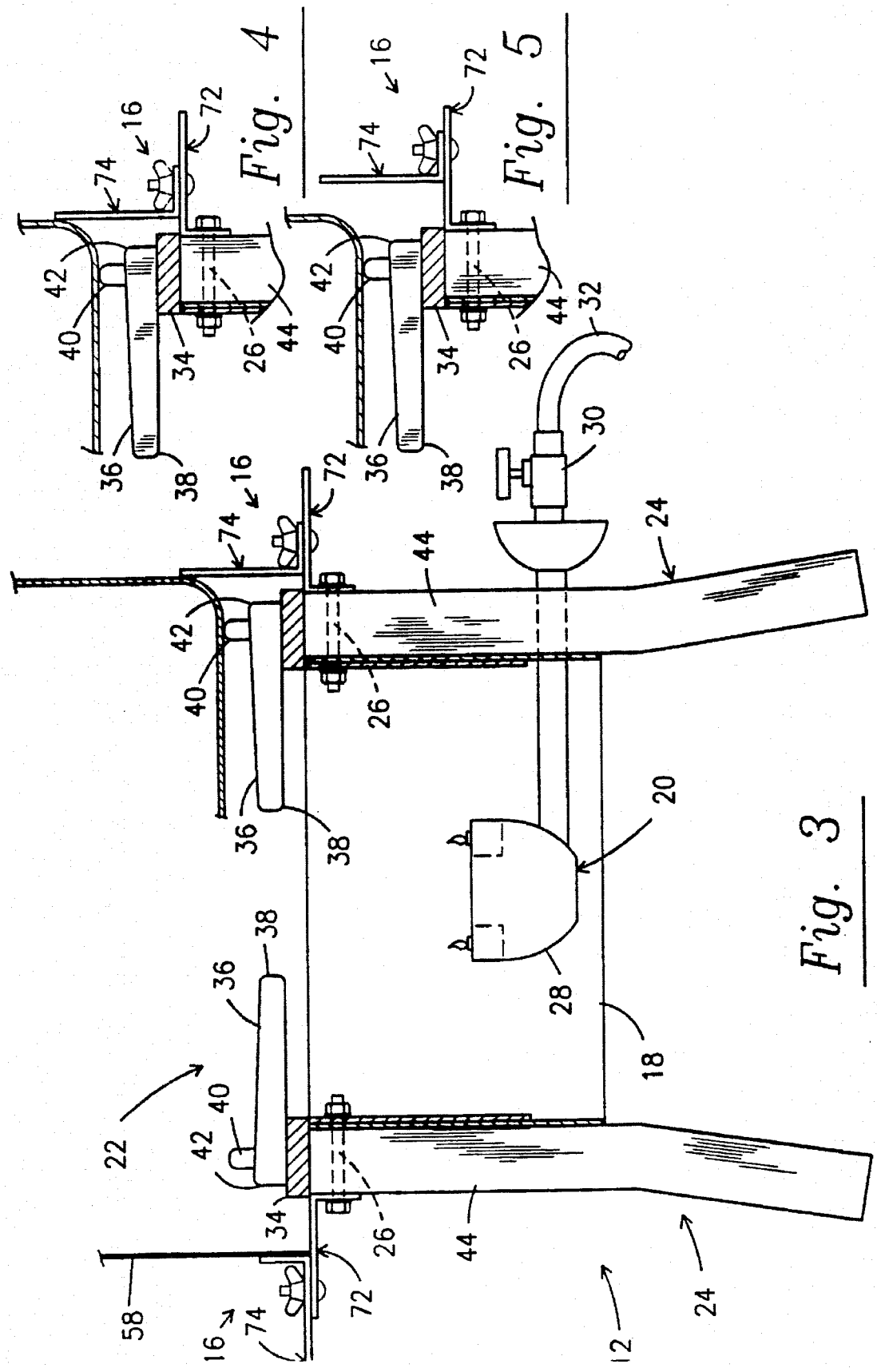

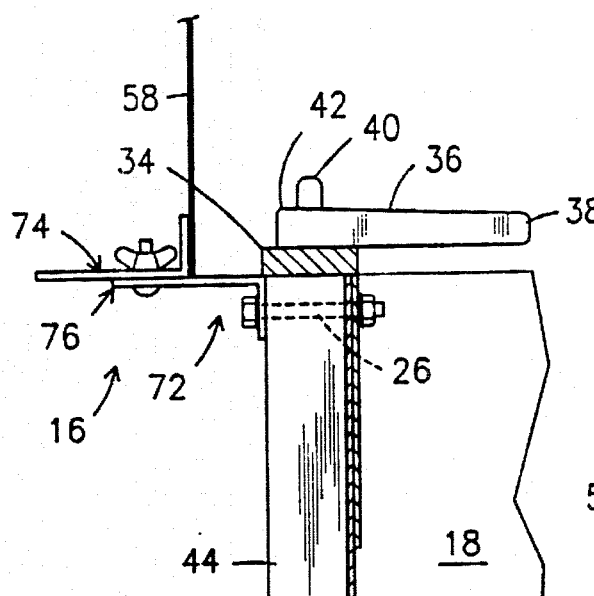
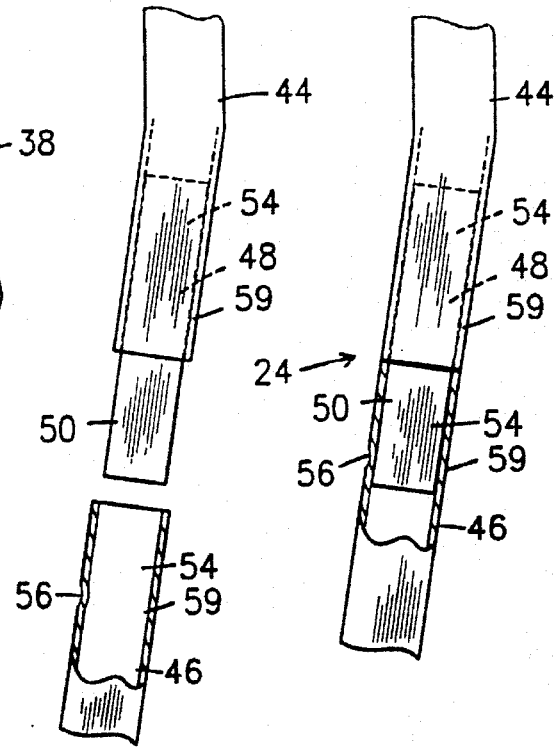
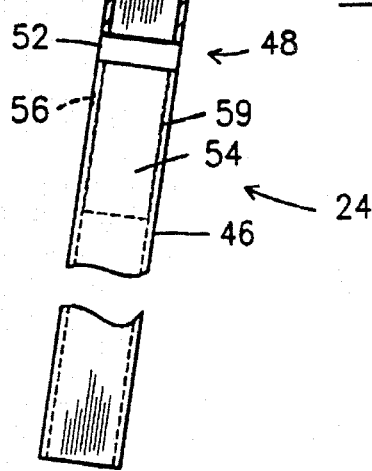
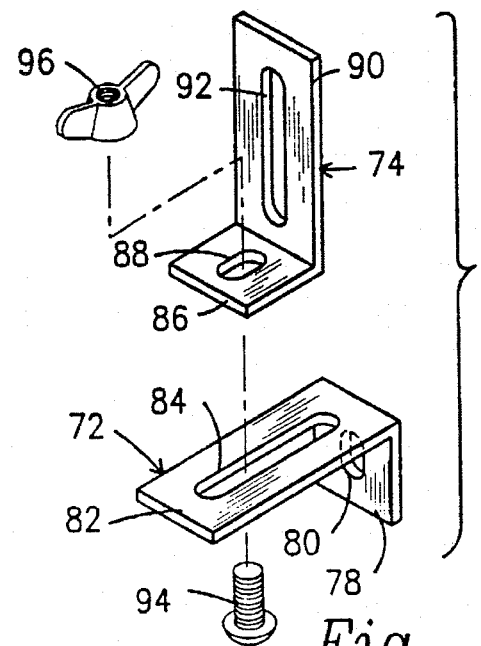
Fig. 10
Fig. 11
Fig. 12
Fig. 13

COMBINATION OUTDOOR COOKER AND SMOKER

This is a continuation application for allowed pending application Ser. No. 08/390,229 filed on Feb. 17, 1995, now U.S. Pat. No. 5,467,692.

BACKGROUND OF THE INVENTION

1. Field of the Invention

A combination outdoor cooker and smoker for alternate use as an outdoor cooker or smoker.

2. Description of the Prior Art

U.S. Pat. No. 2,880,951 relates to a server stand and beverage container stand or server to provide a tray rotatably supported in a raised horizontal position by a support means including means to securely hold a spigot-type beverage container in position for dispensing of the beverage from the beverage container.

U.S. Pat. No. 2,930,561 describes a portable garbage can holder capable of holding various sizes of garbage cans including an L-shaped stop member secured by a bolt to the top member of each leg to contact the lower edge of the U.S. Pat. No. 5,088,682 shows a device including an L-shaped bracket having one leg adapted for removable attachment to a building's roof with a second leg depending down adjacent the position at which the facia board is to be attached. A support member is slidably mounted to the depending leg and supports the facia board in position for attachment to the building. The support is adjustable to accommodate facia boards of different widths.

U.S. Pat. No. 2,115,242 teaches an apparatus for holding down shipping containers in freight cars or other carriers, comprising lateral bands, to embrace the front of the container and arms to embrace the sides thereof. The ends of the arms are provided with foot portions to attach to the side wall of the carrier. Uprights support the bands and arms and embrace the outer corners of the container.

U.S. Pat. No. 2,379,206 describes a means for holding cooking utensils on a galley range having a rail extending longitudinally and spaced laterally from the range comprising a bar, a support adjustable longitudinally on the rail, means to adjustably mount the bar upon the support with the bar extending transversely of the top of the range and having adjustment on the support and adapted to be moved with the support when the support is adjusted on the rail to be disposed in different positions relative to the top of the range, a member adjustably mounted on the bar to engage cooking utensils of different sizes and hold the cooking utensils upon different portions of the range and means to releasably secure the member in adjusted position on the bar.

U.S. Pat. No. 4,118,002 shows a connecting apparatus for connecting a wet dry vacuum cleaner in a vertically spaced relationship with a solution tank. Cleaning solution is dispensed from the solution tank to the article to be cleaned such as a carpet and extracted from the article by the wet dry vacuum cleaner. The connecting apparatus allows a pre-existing vacuum cleaner to be combined with the solution tank or allows the vacuum cleaner to be disassociated from the associated apparatus of the cleaning solution-extraction type cleaning apparatus. The connecting apparatus comprises a plurality of elongated arm members extending essentially from a common connection point within bracket members attached to each arm member to contact the vacuum cleaner and solution tank for retaining the vacuum cleaner and solution tank in an essentially vertically spaced relationship. The solution tank can be formed as a part of a movable cart-like device with the vacuum cleaner positioned essentially vertically above the solution tank by the connecting apparatus or the connecting apparatus can position the solution tank essentially vertically above the vacuum cleaner.

U.S. Pat. No. 3,784,139 teaches a paint bucket support and ladder attachment having a platform and support member to be received in a hollow rung of a ladder and a locking means on the support member to clamp the support member in the hollow rung. The paint bucket support has a flat surface for supporting a paint bucket and lugs to hold the paint bucket in place. The platform has several holes in which to receive such tools as putty knives, screwdrivers and other similar tools.

U.S. Pat. No. 4,108,142 describes a portable barbecue having removable components including a support structure, a gas burner, a flat or domed hot plate above the burner mounted on the support structure. The hot plate includes a plurality of peripheral apertures draining cooking liquids from the hot plate into an annular receptacle therebeneath.

SUMMARY OF THE INVENTION

The present invention comprises a combination outdoor cooker and smoker comprising a cooker assembly, a smoker enclosure detachably mountable on the cooker assembly and a retention assembly comprising a plurality of retention brackets for alternate use as an outdoor cooker or smoker.

The cooker assembly comprises a hollow housing having a heat source therein and a support grate supported thereon and a plurality of support legs attached to the outer periphery of the hollow housing and having a first support configuration to support the combination cooker and smoker on a table and a second support configuration to support the combination cooker and smoker on the ground.

Each support leg comprises an upper hollow support leg section and a lower hollow support leg section detachably coupled together by a similarly configured support leg coupler.

Each support leg coupler comprises a support leg connector member and a securing means or dimple formed in adjacent end portions of the upper hollow leg section and the lower hollow support leg section. The outer dimension of the support leg connector member or end portions is slightly less than the inside diameter of the upper hollow leg section and the lower hollow support leg section such that each end portion slides into the corresponding end portion such that the end portions engage the opposite ends of the intermediate collar. The dimple formed on each adjacent end portion press fits against the side wall of the corresponding end portion to secure each end portion within the corresponding end portion to hold each support leg in the second support configuration to support the combination outdoor cooker and smoker above the ground. Since there is limited friction between the side wall of each corresponding end portion and the corresponding dimple, the upper hollow support leg section, lower hollow support leg section and the similarly configured support leg coupler are relatively easy to assemble and disassemble.

The smoker enclosure comprises a hollow shell having a dome formed on the upper portion thereof and a plurality of smoker legs attached to the lower portion thereof. An access door is hingedly attached to the hollow shell to selectively permit access to the interior of the hollow shell through an opening formed therethrough.

Each of the plurality of retention brackets comprises a mounting bracket element coupled by a corresponding fastener to the cooker assembly and a retainer bracket element adjustably coupled to the corresponding mounting bracket element by a corresponding fastener. Each mounting bracket element comprises an attachment leg and a substantially horizontal connecting leg wherein the substantially horizontal connecting leg is longer than the attachment leg to cooperatively form a substantially, L-shaped configuration. Each retainer bracket element is similarly configured to the mounting bracket element comprising a smoker retention leg and a utensil retention leg wherein the utensil retention leg is longer than the smoker retention leg 86 to cooperatively form a substantially L-shaped configuration.

When the combination outdoor cooker and smoker is in the cooker configuration, each substantially horizontal connecting leg and corresponding smoker retention leg are substantially parallel relative to each other such that the corresponding utensil retention leg is substantially vertical and extends above the limits or stops formed in the support grate whereby larger utensils will rest on the limits or stops and be disposed to engage the side of the utensils retention legs. To accommodate utensils of different diameters, the retainer bracket elements may be adjusted rotationally and longitudinally relative to the corresponding mounting bracket elements.

When the combination outdoor cooker and smoker is in the smoker configuration, each connecting leg and corresponding utensil retention leg are substantially parallel relative to each other such that the corresponding smoker retention leg is substantially vertical and disposed to engage the side of the hollow shell. To accommodate smoker enclosure of different diameters, the retainer bracket elements may be adjusted rotationally and longitudinally relative to the corresponding mounting bracket elements.

When the combination outdoor cooker and smoker is to be used on a table, the lower hollow support leg sections are removed, When the combination outdoor cooker and smoker is to be used on the ground the lower hollow support leg sections are attached to the corresponding upper hollow support leg sections by the corresponding support connector members.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 3 is a partial cross-sectional side view of the combination outdoor cooker and smoker of the present invention.

FIG. 4 is a detailed view of the retention bracket of the present invention in the fully retracted position of the cooker retention configuration.

FIG. 5 is a detailed view of the retention bracket of the present invention in an intermediate position of the cooker retention configuration.

FIG. 7 FIG. 4 is a detailed view of the retention bracket of the present invention in the fully retracted position of the smoker retention configuration.

FIG. 10 is a detailed view of the support leg including the support leg coupler of the present invention.

FIG. 11 is an exploded detailed view of the support leg including an alternate embodiment of the support leg coupler.

FIG. 12 is an assembled detailed view of the support leg including the alternate embodiment of the support leg coupler shown in FIG. 11.

FIG. 13 is an exploded perspective detailed view of the retention bracket.

Similar reference characters refer to similar parts throughout the several views of the drawings.

DETAILED DESCRIPTION OF THE PREFERRED EMBODIMENT

Figure 1:
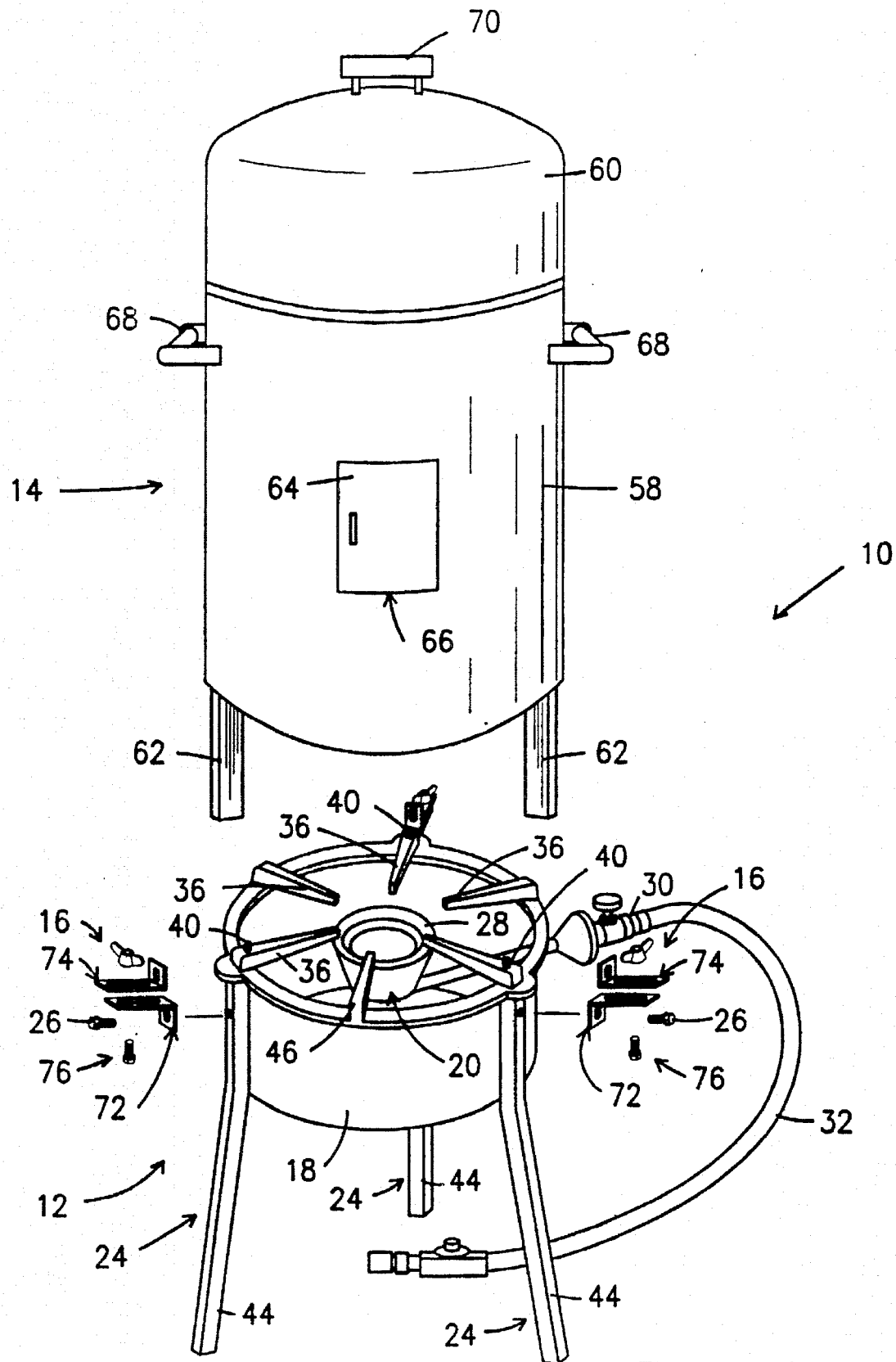
FIG. 1 is an exploded perspective view of the combination outdoor cooker and smoker of the present invention.

As best shown in FIG. 1, the present invention comprises a combination outdoor cooker and smoker generally indicated as 10 comprising a cooker assembly generally indicated as 12, a smoker enclosure generally indicated as 14 detachably mountable on the cooker assembly 12 and a retention assembly comprising a plurality of retention brackets each generally indicated as 16 for alternate use as an outdoor cooker or smoker.

Figure 2:
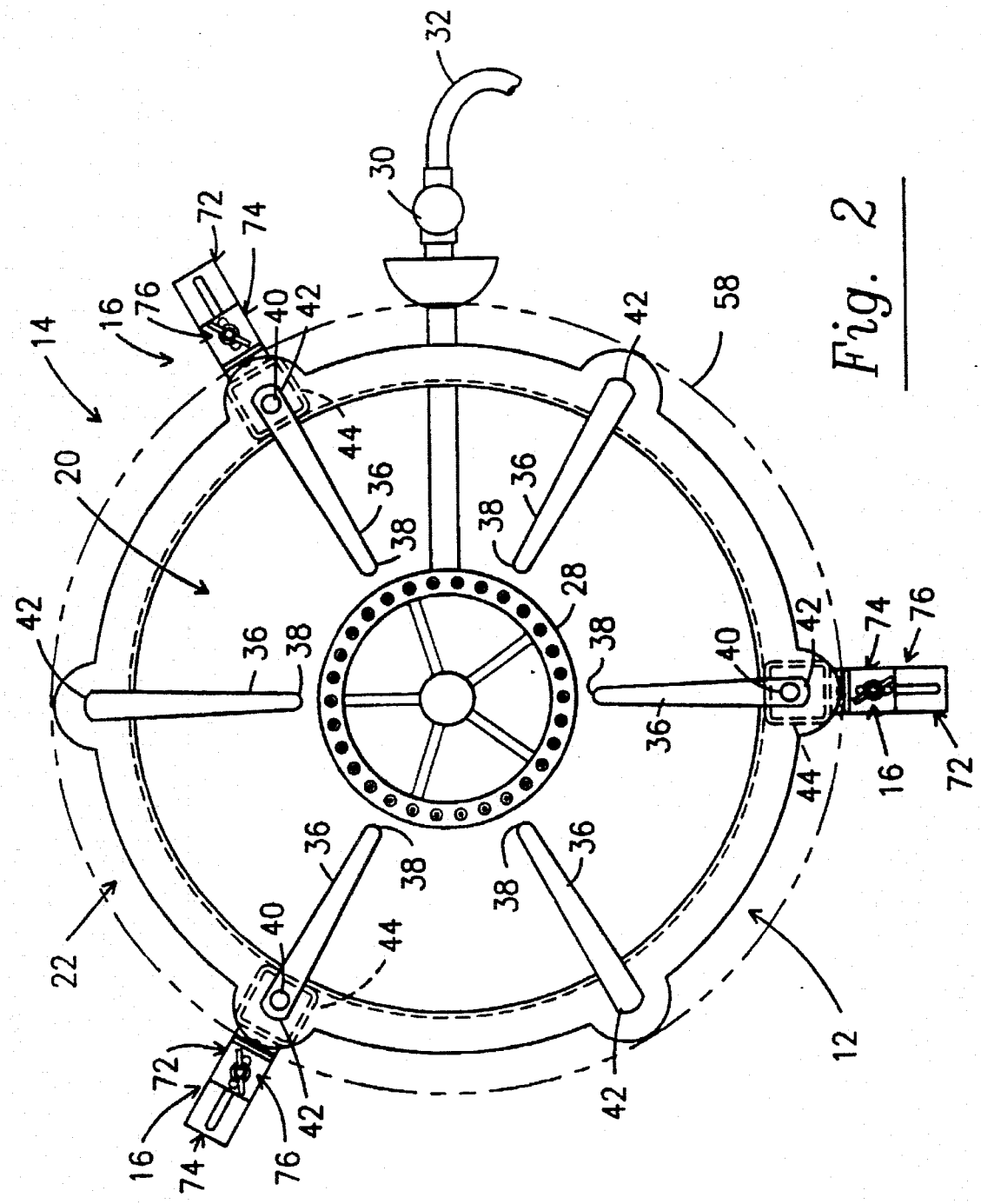
FIG. 2 is a top view of the combination outdoor cooker and smoker of the present invention.

As best shown in FIGS. 1 through 3, the cooker assembly 12 comprises a substantially cylindrical hollow housing 18 having a heat source generally indicated as 20 therein and a support grate generally indicated as 22 supported thereon disposed in heat exchange relationship relative to the heat source 20 and a plurality of support legs each generally indicated as 24 attached to the outer periphery of the substantially cylindrical hollow housing 20 by a corresponding plurality of fasteners each indicated as 26 and having a first support configuration to support the combination cooker and smoker 10 on a table and a second support configuration to support the combination cooker and smoker 10 on the ground as described more fully hereinafter.

Figure 6:
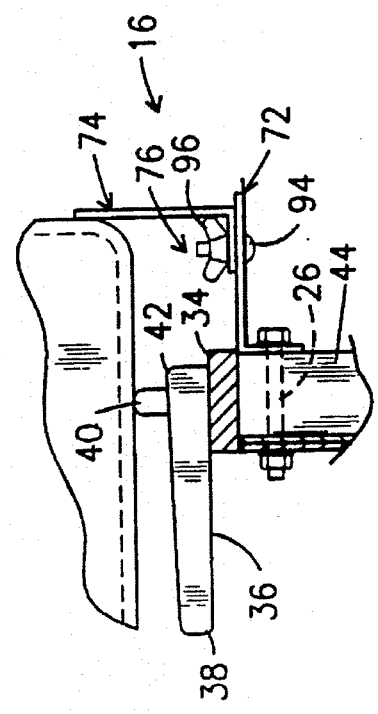
FIG. 6 is a detailed view of the retention bracket of the present invention in the fully extended position of the cooker retention configuration.

As best shown in FIGS. 1 through 3, the heat source 20 may comprise a gas burner 28 coupled to an external gas source (not shown) through a flow control valve 30 by a gas supply conduit 32. Of course, charcoal or other suitable heat-sources may be used in place of the gas burner 28. As best shown in FIGS. 1 through 3, the support grate 22 comprises a circular ring 34 having a plurality of substantially horizontal support arms each indicated as 36 extending inwardly therefrom toward the center of the support grate 22 such that the inner ends 38 thereof are disposed adjacent the gas burner 28. A limit or stop 40 extends upwardly from the outer end 42 of several of the substantially horizontal support arms 36 to engage the side wall of a smaller cooking utensil as shown in FIG. 6 having a radius less then the distance from the center of the support grate 22 to the inner edge or periphery of the end limit or stop 40 to retain the cooking utensil on the support grate 22.

As best shown in FIGS. 10 through 12, each support leg 24 comprises an upper hollow support leg section 44 and a lower hollow support leg section 46 detachably coupled together by a similarly configured support leg coupler generally indicated as 48.

As shown in FIG. 10, each support leg coupler 48 comprises a support leg connector member 50 having an intermediate collar 52 attached to the mid portion thereof to form opposite end portions 54 and a securing means or dimple 56 formed in adjacent end portions 59 of the upper hollow leg section 44 and the lower hollow support leg section 46. The outer dimension of the support leg connector member 50 or end portions 54 is slightly less than the inside diameter of the upper hollow leg section 44 and the lower hollow support leg section 46 such that each end portion 54 slides into the corresponding end portion 59 such that the end portions engage the opposite ends of the intermediate collar 52. The dimple 56 formed on each adjacent end portion 59 press fits against the side wall of the corresponding end portion 54 to secure each end portion 54 within the corresponding end portion 59 to hold each support leg 24 in the second support configuration to support the combination outdoor cooker and smoker 10 above the ground. Since there is limited friction between the side wall of each corresponding end portion 54 and the corresponding dimple 56, the upper hollow support leg section 44, lower hollow support leg section 46 and the similarly configured support leg coupler 48 are relatively easy to assemble and disassemble.

FIGS. 11 and 12 show an alternate embodiment of the support leg coupler 48. Specifically, the support leg coupler 48 comprises a support leg connector member 50 having opposite end portions 54 and a securing means or dimple 56 formed in adjacent end portions 59 of the upper hollow leg section 44 and the lower hollow support leg section 46. The outer dimension of the support leg connector member 50 or end portions 54 is slightly less than the inside diameter of the upper hollow leg section 44 and the lower hollow support leg section 46 such that each end portion 54 slides into the corresponding end portion 59. The dimple 56 formed on each adjacent end portion 59 press fits against the side wall of the corresponding end portion 54 to secure each end portion 54 within the corresponding end portion 59 to hold each support leg 24 in the second support configuration to support the outdoor cooker and smoker 10 above the ground. Since there is limited friction between the side wall of each end portion 54 and the corresponding dimple 56, to the upper hollow support leg section 44, lower hollow support leg section 46 and the similarly configured support leg coupler 48 are relatively easy to assemble and disassemble.

As best shown in FIG. 1, the smoker enclosure 14 comprises a substantially cylindrical hollow shell 58 having a dome 60 formed on the upper portion thereof and a plurality of smoker legs each indicated as 62 attached to the lower portion thereof. An access door 64 is hingedly attached to the substantially cylindrical hollow shell 58 to selectively permit access to the interior of the substantially hollow shell 58 through an opening 66 formed therethrough. A pair of smoker handles each indicated as 68 are attached to the substantially cylindrical hollow shell; while, a single door handle 70 is attached to the top portion of the dome 60.

Each of the plurality of retention brackets 16 comprises a mounting bracket element 72 coupled by a corresponding fastener 26 to the cooker assembly and a retainer bracket element 74 adjustably coupled to the corresponding mounting bracket element 72 by a corresponding fastener generally indicated as 76. As best shown in FIG. 13, each mounting bracket element 72 comprises an attachment leg 78 having an aperture 80 formed therethrough and a substantially horizontal connecting leg 82 having a slot 84 formed therethrough wherein the substantially horizontal connecting leg 82 is longer than the attachment leg 78 to cooperatively form a substantially L-shaped configuration. As best shown in FIG. 13, each retainer bracket element 74 is similarly configured to the mounting bracket elements 72 comprising a smoker retention leg 86 having an aperture 88 formed therethrough and a utensil retention leg 90 having a slot 92 formed therethrough wherein the utensil retention leg 90 is longer than the smoker retention leg 86 to cooperatively form a substantially L-shaped configuration. Each fastener 76 may comprise an externally threaded bolt 94 and an internally threaded wing nut 96 to selectively pass through the corresponding slot 84 and either the corresponding aperture 88 or the corresponding slot 92 to couple corresponding mounting bracket elements 72 and corresponding retainer bracket elements 74 in either the cooker configuration or smoker configuration and positioned from between the fully retracted position to the fully extended position as described more fully hereinafter.

Use of the combination outdoor cooker and smoker 10 as an outdoor cooker is best understood with reference to the right side of FIG. 3 and FIGS. 4 through 6. Specifically, when the combination outdoor cooker and smoker 10 is in the cooker configuration, each substantially horizontal connecting leg 82 and corresponding smoker retention leg 86 are substantially parallel relative to each other with the externally threaded bolt 94 extending through corresponding slot 84 and corresponding aperture 88, and secured by the internally threaded wing nut 96 such that the corresponding utensil retention leg 90 is substantially vertical and extends above the limits or stops 40 whereby larger utensils will rest on the limits or stops 40 and be disposed to engage the side of the utensils retention legs 90. To accommodate utensils of different diameters, the retainer bracket elements 74 may be adjusted rotationally and longitudinally relative to the corresponding mounting bracket elements 72. In particular, when the utensil retention leg 90 is rotated and positioned longitudinally inwardly on the connecting leg 82 to be disposed adjacent the proximal end of the connecting leg 82, the retainer bracket elements 74 are in the fully retracted position (FIG. 4). The plurality of retention brackets 16 may then be adjusted by sliding the utensil retention legs 90 to the intermediate position outwardly toward the distal end of the corresponding connecting leg (FIG. 5). Finally, the plurality of retention brackets 16 may be further adjusted to the fully extended position by rotating the utensil retention legs 90 relative to the connecting legs 82 to position the utensil retention legs 90 adjacent the distal end of the connecting legs (FIG. 6).

Figure 7:
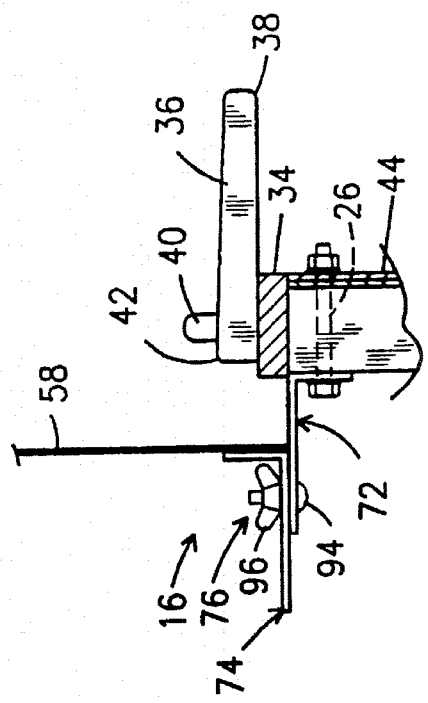
Figure 8:
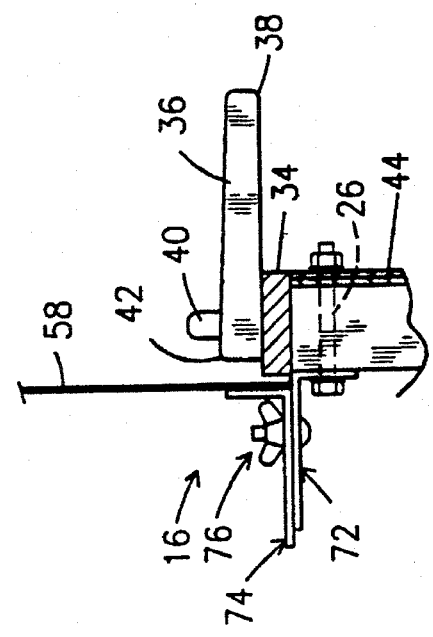
FIG. 8 is a detailed view of the retention bracket of the present invention in an intermediate position of the smoker retention configuration.
Figure 9:
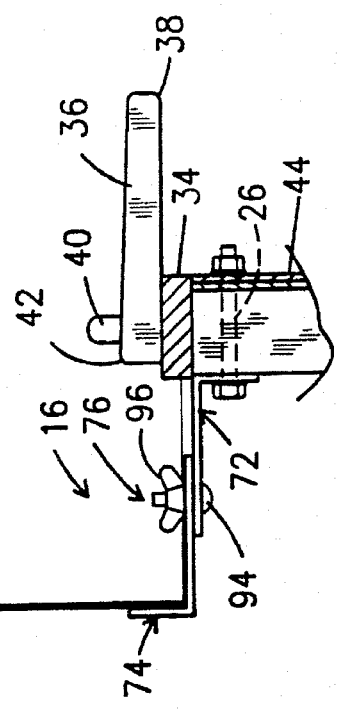
FIG. 9 is a detailed view of the retention bracket of the present invention in the fully extended position of the smoker retention configuration.

Use of the combination outdoor cooker and smoker 10 as a smoker is best understood with reference to the left side of FIG. 3 and FIGS. 7 through 9. Specifically, when the combination outdoor cooker and smoker 10 is in the smoker configuration, each substantially horizontal connecting leg 82 and corresponding utensil retention leg 80 are substantially parallel relative to each other with the externally threaded bolt 94 extending through corresponding slot 84 and corresponding aperture 92, and secured by the internally threaded wing nut 96 such that the corresponding smoker retention leg 86 is substantially vertical and disposed to engage the side of the substantially cylindrical hollow shell 58. To accommodate smoker enclosure 14 of different diameters, the retainer bracket elements 74 may be adjusted rotationally and longitudinally relative to the corresponding mounting bracket elements 72. In particular, when the smoker retention leg 86 is rotated and positioned longitudinally inwardly on the connecting leg 82 to be disposed adjacent the proximal end of the connecting leg 82, the retainer bracket elements 74 are in the fully retracted position (FIG. 7). The plurality of retention brackets 16 may then be adjusted by sliding the smoker retention legs 86 to the intermediate position outwardly toward the distal end of the corresponding connecting leg (FIG. 8). Finally, the plurality of retention brackets 16 may be further adjusted to the fully extended position by rotating the smoker retention legs 86 relative to the connecting legs 82 to position the smoker retention legs 86 adjacent the distal end of the connecting legs (FIG. 9).

When the combination outdoor cooker and smoker 10 is to be used on a table, the lower hollow support leg sections 46 are removed as best shown in FIG. 3.

When the combination outdoor cooker and smoker 10 is to be used on the ground, each lower hollow support leg section 46 are attached to the corresponding upper hollow support leg section 44 by the corresponding support connector member 50 as shown in FIG. 10 or FIGS. 11 and 12.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A retention assembly to convert an outdoor cooker to a combination outdoor cooker and smoker having a cooker configuration for use as an outdoor cooker and a smoker configuration for use as a smoker comprising a cooker assembly including a hollow housing having a heat source therein and a support grate supported thereon disposed in heat exchange relationship relative to the heat source and a plurality of support legs attached to the hollow housing and a smoker enclosure detachably mountable on said cooker assembly when said combination outdoor cooker and smoker is in said smoker configuration said retention assembly comprising a plurality of retention brackets attached to said cooker assembly each having a cooker retention configuration to retain a cooking utensil in operative relationship relative to said support grate when said combination cooker and smoker is in said cooker configuration and a smoker retention configuration to retain said smoke enclosure in operative relationship relative to said support grate when said combination cooker and smoker is in said smoker configuration.

2. The retention assembly to convert an outdoor cooker to a combination outdoor cooker and smoker of claim 1 wherein said support legs each having a first support configuration to support the combination outdoor cooker and smoker on a table and a second support configuration to support the combination outdoor cooker and smoker on the ground.

3. The retention assembly to convert an outdoor cooker to a combination outdoor cooker and smoker of claim 1 wherein each of the plurality of retention brackets comprises a mounting bracket element coupled by a corresponding fastener to the cooker assembly and a retainer bracket element adjustably coupled to the corresponding mounting bracket element by a corresponding fastener.

4. The retention assembly to convert an outdoor cooker to a combination outdoor cooker and smoker of claim 3 wherein, each said retainer bracket element is similarly configured to the mounting bracket elements comprising a smoker retention leg having an aperture formed therethrough and a utensil retention leg having a slot formed therethrough wherein said utensil retention leg is longer than the smoker retention leg to cooperatively form a substantially L-shaped configuration and each retainer bracket element comprises a smoker retention leg having an aperture formed therethrough and a utensil retention leg having a slot formed therethrough wherein said utensil retention leg is longer than said smoker retention leg to cooperatively form a substantially L-shaped configuration.

5. The retention assembly to convert an outdoor cooker to a combination outdoor cooker and smoker of claim 4 wherein each said fastener comprises an externally threaded bolt and an internally threaded wing nut to selectively pass through the corresponding slot and either the corresponding aperture or the corresponding slot to couple corresponding mounting bracket elements and corresponding retainer bracket elements in either the cooker configuration or smoker configuration and positioned from between the fully retracted position to the fully extended position as described more fully hereinafter.

* * * * *